(12) United States Patent
Ackley

(10) Patent No.: US 6,435,530 B1
(45) Date of Patent: Aug. 20, 2002

(54) ANTI-ROLL MECHANISM FOR VEHICLE SUSPENSION SYSTEM

(75) Inventor: Robert Joseph Ackley, South Lyon, MI (US)

(73) Assignee: Delphi Technologies, Inc., Troy, MI (US)

(*) Notice: Subject to any disclaimer, the term of this patent is extended or adjusted under 35 U.S.C. 154(b) by 22 days.

(21) Appl. No.: 09/775,301

(22) Filed: Feb. 1, 2001

(51) Int. Cl.⁷ ............................................. B60G 21/05
(52) U.S. Cl. ..................... 280/124.106; 280/124.137; 280/124.166
(58) Field of Search .................. 280/124.106, 124.105, 280/124.104, 124.137, 124.149, 124.166, 93.502, 93.51

(56) References Cited

U.S. PATENT DOCUMENTS 5,324,056 A * 6/1994 Orton .................. 280/124.106
6,142,494 A * 11/2000 Higuchi ............... 280/124.106
6,189,897 B1 * 2/2001 Santa Cruz et al. .. 280/124.106

* cited by examiner

Primary Examiner—Paul N. Dickson
Assistant Examiner—Faye M. Fleming
(74) Attorney, Agent, or Firm—Scott A. McBain

(57) ABSTRACT

Vehicle suspension movements are transmitted to an anti-roll mechanism which is pivotally mounted on the vehicle for movement about the pitch axis thereof to accommodate normal ride motion of the vehicle in which wheels on opposite sides of the vehicle move equally. Vehicle roll is controlled by an anti-roll mechanism includes a torsion bar which is loaded by the suspension movement. Roll stiffness is controlled by adjusting the lever arm through which suspension movement is transmitted to the torsion bar by a lever arrangement commonly referred to as a Watt's link to assure that the change in the length of the lever arm is directly proportional to the change in the control in the cockpit. Accordingly, linear control is assured, and the torsion bar and lever arms do not appreciable deflect during cornering.

20 Claims, 2 Drawing Sheets

ANTI-ROLL MECHANISM FOR VEHICLE SUSPENSION SYSTEM

TECHNICAL FIELD

This invention relates to an adjustable anti-roll mechanism which is particularly suited for an open wheel style racing car.

BACKGROUND OF THE INVENTION

Racing cars are regularly subjected to harsh cornering maneuvers which tend to roll the vehicle about the roll or longitudinal axis thereof. Accordingly, the vehicle suspension system must exhibit roll stiffness, or resistance to roll around the roll axis of the vehicle. These types of vehicles have suspension systems which include an anti-roll mechanism, which resists this tendency of the vehicle to roll during cornering, while still accommodating normal vehicle riding motions in which wheels on opposite sides of the vehicle move substantially equally and all significant vehicle suspension movement is about the pitch axis of the vehicle. Race cars may have two separate anti-roll mechanisms, one of which controls the roll stiffness of the rear wheel suspension and the other controlling the roll stiffness of the front wheel suspension. Conventionally, the driver may adjust the roll stiffness of the vehicle suspension during racing by operating a control in the cockpit.

Drivers commonly complain that existing adjustable roll control mechanisms are "non-linear", that is, that a given adjustment of the control in the cockpit does not always result in a corresponding change in roll stiffness. Drivers also complain that the roll stiffness does not feel constant during cornering, so that the handling characteristics of the car change during cornering, making the car unstable. Both of these complaints are the result of deflections inherent in prior anti-roll mechanisms.

SUMMARY OF THE INVENTION

According to the present invention, vehicle suspension movements are transmitted to an anti-roll mechanism which is pivotally mounted on the vehicle for movement about the pitch axis thereof to accommodate normal ride motion of the vehicle in which wheels on opposite sides of the vehicle move equally. The anti-roll mechanism includes a torsion bar which is loaded by suspension movement. Roll stiffness is controlled by adjusting the lever arm through which suspension movement is transmitted to the torsion bar by a lever arrangement commonly referred to as a Watt's link to assure that the change in the length of the lever arm is directly proportional to the change in the control in the cockpit. Accordingly, linear control is assured, and the torsion bar and lever arms to not appreciable deflect during cornering. While the invention is particularly described as being used in a racing car, other vehicles, such as passenger cars and similar vehicles may also benefit from the present invention.

DESCRIPTION OF THE PREFERRED EMBODIMENT

Figure 1:
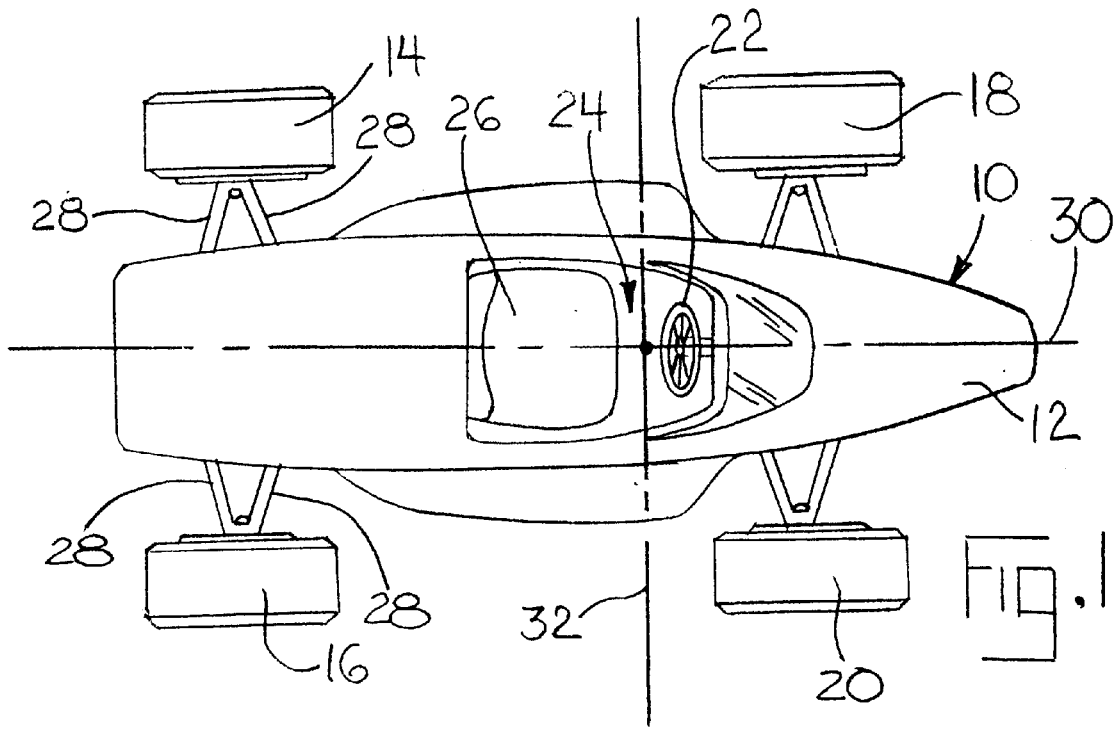
FIG. 1 is a schematic illustration, taken from above, of a racing car upon which the anti-roll mechanism of the present invention is typically used.

Referring now to the drawings, a typical, open cockpit racing car upon which an anti-roll mechanism of the present invention is typically used is illustrated generally by the numeral 10. The racing car 10 includes a body 12, which is supported by rear wheels 14, 16 and front wheels 18, 20 in the conventional manner, so that the front wheel are steered by operation of a steering wheel 22 in the cockpit 24 of the racing car 10. Each of the rear wheels 14,16 are supported on the body 12 by a conventional suspension system, which includes rocker arms 28, which extend into the body 12. The cockpit 24 includes a seat 26 for the driver, as well as other standard vehicle controls (brake pedal, clutch pedal, gearshift, etc.) well known to those skilled in the art. The cockpit also includes a lever (not shown) which is easily accessable to the driver for controlling the anti-roll mechanism of the present invention, as will be hereinafter described. For reference, the vehicle roll axis, which extends longitudinally in the vehicle direction of travel, is indicated at 30, and the vehicle pitch axis, which extends transversely with respect to the vehicle, is indicated at 32.

Figure 2:
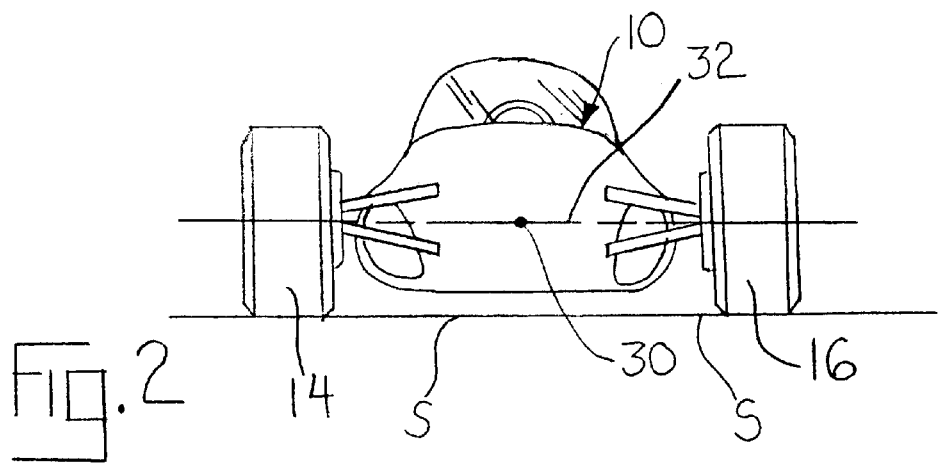
FIG. 2 is a rear view of the racing car illustrated in FIG. 1.
Figure 3:
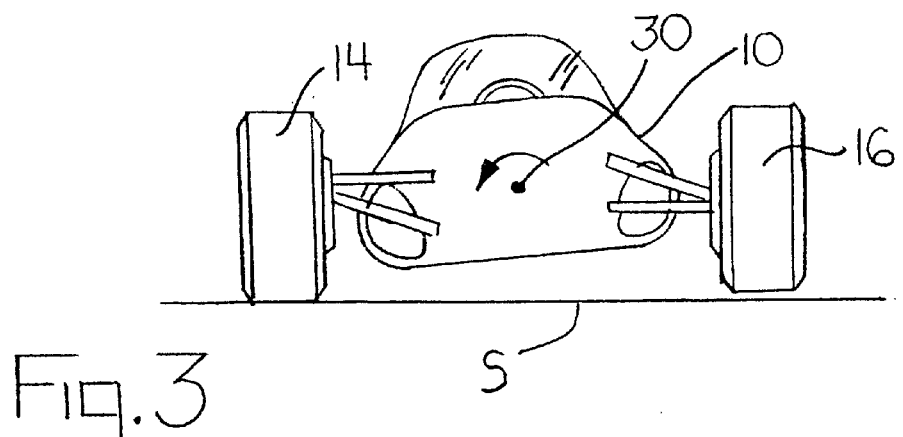
FIG. 3 is a view similar to FIG. 2, but illustrating the racing car during a severe cornering maneuver.
Figure 4:
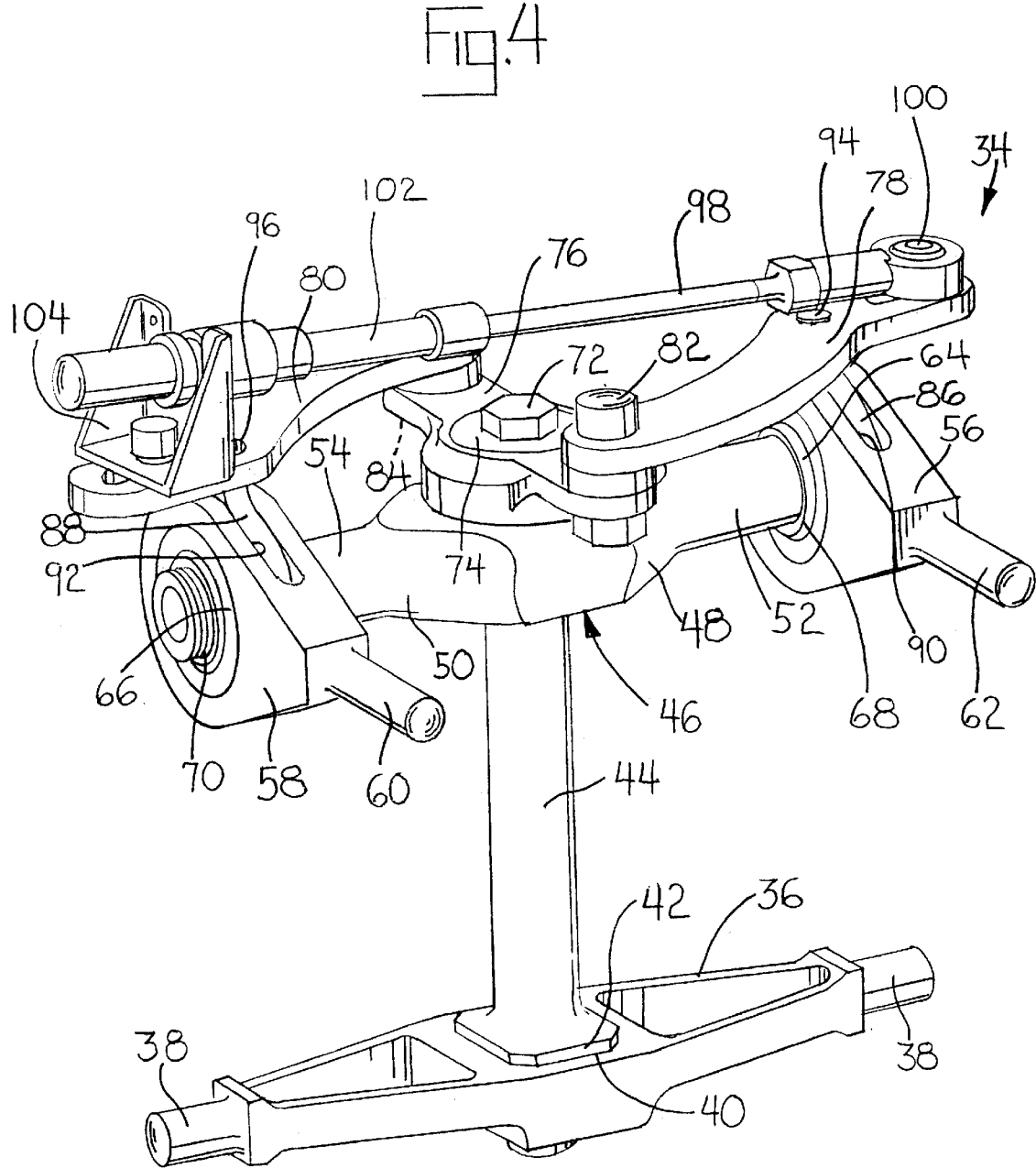
FIG. 4 is a perspective view of an anti-roll mechanism made pursuant to the present invention that is adapted to be used in the racing car illustrated in FIGS. 1–3.

Referring now to FIGS. 2 and 3, during normal forward movement of the vehicle when the vehicle suspension system accommodates only vehicle ride motions and lateral forces acting on the vehicle 10 are not significant, both of the rear wheels 14, 16 move substantially the same amount. However, during cornering, lateral forces acting on the vehicle cause the vehicle to pivot about the roll axis 30 or the vehicle, as illustrated in FIG. 3. As illustrated in FIG. 3, during sever cornering, one of the rear wheels may lift off of the pavement surface S, causing the vehicle to become unstable. Accordingly, it is necessary to resist vehicle roll about the roll axis to maintain stability of the vehicle. The relative roll stiffness of the front and rear suspensions along with the placement of the roll axis determines how much weight transfer takes place from the inside to outside tires (front and rear ). The relative amount of weight transfer front to rear is what is used to tune the limit handling characteristics (and stability) of the vehicle. When the vehicle rotates around the roll axis, instability may result even if a wheel does not lift off of the pavement surface. The anti-roll mechanism of the present invention indicated generally at 34 (FIG. 4) provides such roll resistance, the roll stiffness being adjustable by the driver.

The anti-roll mechanism 34 is mounted in the vehicle body 10 in any appropriate location. Although the anti-roll mechanism 34 is illustrated in controlling the rear wheels of the vehicle and would normally be mounted behind the cockpit 24, a similar mechanism may be used to control the front wheels of the vehicle. Anti-roll mechanism 34 includes a mounting member 36 which terminates in substantially cylindrical end portions 38 that are attached to pillow block bearings (not shown) mounted on the vehicle to permit the mounting member 36 to rotate freely about the pitch axis of the vehicle. Accordingly, during the normal ride motions of the vehicle (substantially the same movement of the left and right wheels), the anti-roll mechanism 34 rotates freely relative to the vehicle. Midway between the end portions 38, the mounting member 36 defines a downwardly tapering (viewing FIG. 4) receiver socket 40 having a square cross section that receives a tapered, similarly shaped tongue 42 of a torsion bar 44 so that relative rotation between the tongue 42 and the mounting member 36 is prevented. Of course, instead of a square cross section, the socket 40 and tongue 42 may have a polygonal cross section other than square.

The other end of the torsion bar 44 also terminates in a tongue (not shown) similar to the tongue 42 which is received in a socket (not shown) similar to the socket 40 at substantially the midpoint of a crossbar 46 which includes portions 48,50 which extend laterally in opposite directions from the torsion bar 44. Portions 48,50 define cylindrical sliding surfaces 52,54 which slidably support end pieces 56,58 for sliding movement toward and away from the torsion bar 44. Each of the end pieces 56,58 extend from corresponding equalizer links 60 and 62, which are a part of the vehicle suspension system. Link 60 is connected to rocker arms 28 supporting rear wheel 14, and transmits deflection of the rocker arms 28 supporting rear wheel 14 to the end piece 58. Similarly, link 62 is connected to the rocker arms 28 supporting rear wheel 16, and transmits deflection of the rocker arms 28 supporting rear wheel 16 to the end piece 60, Each of the end pieces 56,58 are supported by spherical bearing assemblies 64,66, which allow the corresponding end pieces to pivot relative to the cross bar 46. Each bearing assembly 64,66 include an inner race 68,70 to permit the end pieces 56,58 to slide along the cylindrical sliding surfaces 50,52.

A bolt 72 extends axially through the torsion bar 44 and through the cross bar 46 and mounting member 36 to hold the cross bar, the torsion bar, and the mounting member together. Accordingly, the anti-roll mechanism 34 may be disassembled and the torsion bar 44 replaced with a torsion bar having a different torsional stiffness. Accordingly, a library of torsion bars 44 may be provided to enable a mechanic to provide a suitable range of torsional stiffness for the suspension system.

A pivot member 74 circumscribes the end of the bolt 72 and mounts an intermediate lever 76 for pivoting about the axis of the torsion bar 44. Lever arms 78,80 are pivotally mounted on opposite ends of the intermediate lever 76 by pivot connections 82,84. Each of a pair of rings 86,88 extend through slots 90,92 of a corresponding end piece 56,58 and wrap around the outer races (not shown) of the bearing assemblies 64,66 which support the end pieces 56,58 on the cross bar 46. Each of the rings 86,88 terminate in a post 94,96 which pivotally engages an aperture in a corresponding one of the lever arms 78,80. A cable 98 is pivotally mounted to the lever arm 78 by a pivot connection 100. The cable 98 extends through a cable guide 102 that is supported by a bracket 104 pivotally mounted on the lever arm 80. Accordingly, when the cable 98 is pulled so that the pivot connection is moved toward the bracket 104, both of the end pieces 56,58 and moved toward the torsion bar 44 by an identical distance. Conversely, when the cable is operated in the opposite direction pushing the connection 100 away from the bracket 104, each of the end pieces 56, 58 are pushed away from the torsion bar 44 by an identical amount. It will be noted that the pivoting of the levers 78,80 is transmitted to the end pieces 56,58 by the rings 86,88 to slide the end pieces 56,58 along the cross bar 46. The arrangement of the lever arms 78,80, and the intermediate lever 76 is commonly referred to by those skilled in the art as a Watt's link adjustment mechanism.

In operation, when the vehicle is operated on a straight, flat road segment, vehicle suspension movements of the rear wheels 14,16 are substantially equal. The anti-roll mechanism rotates freely about the bearings (not shown) connecting the mounting member 36 to the vehicle and the torsion bar 44 is unaffected because suspension forces acting across the vehicle are equal. During a more severe vehicle cornering maneuver, when vehicle roll forces are a factor, suspension forces are unequal across the vehicle (as can be seen in FIG. 3); accordingly, the suspension forces applied to the cross bar 46 through the end pieces 56,58 will also be unequal, thereby tending to twist the torsion bar, which resists such twisting thereby causing resistance to the suspension movement which increases as the degree of suspension movement increases, thereby providing resistance to rolling of the vehicle. Since the magnitude of the twisting motion applied to the torsion bar 44 is a function of the length of the lever arm along the cross bar 46 between the end pieces 56,58 and the torsion bar 44, movement of the end pieces 56,58 along the cross bar 46 by operation of the cable 98 changes the magnitude of the moment applied to the torsion bar 44 for a given magnitude of suspension movement. Accordingly, the magnitude of the roll resistance provided by the anti-roll mechanism 34 may be changed by the driver by operation of the aforementioned lever in the cockpit. As explained above, both of the end pieces 56,58 will be moved the same amount for a given movement of the lever, and the change in roll resistance changes linearly by movement of the lever since a given movement of the lever always moves each of the end pieces 56,58 the same proportional distance. Accordingly, the roll resistance of the vehicle will remain constant during cornering (unless the position of the lever is changed) and all changes in roll resistance will be linear, will be the same across the vehicle, and will be in proportion to lever movement.

What is claimed is:

1. Anti-roll mechanism for a vehicle having a suspension system mounting wheels on opposite sides of the vehicle for movement relative to said vehicle, said anti-roll mechanism being connected to the suspension system for controlling vehicle movement about the roll axis of the vehicle, said anti-rollmechanism comprising a torsion bar, a mounting member mounted on said vehicle and nonrotatably connected to said torsion bar, a cross bar nonrotatably connected to said torsion bar, a pair of end pieces slidably and rotatably mounted on said cross bar for sliding movement toward and away from the torsion bar, a pair of suspension links connecting said end pieces to the wheel suspension systems of wheels on opposite sides of the vehicle whereby movement of the vehicle about the roll axis is transmitted through said cross bar to said torsion bar to load the torsion bar, and a driver controlled linkage for moving said end pieces toward and away from said torsion bar.

2. Anti-roll mechanism as claimed in claim 1, wherein said vehicle defines a pitch axis extending horizontally normal to said roll axis, said mounting member being pivotally connected to said vehicle to permit pivoting of the vehicle relative to the mounting member about said pitch axis.

3. Anti-roll mechanism as claimed in claim 1, wherein said torsion bar and said mounting member are connected by a tongue and socket connection having a polygonal cross section to prevent relative rotation between the tongue and the socket.

4. Anti-roll mechanism as claimed in claim 1, wherein said torsion bar and said cross bar are connected by a tongue and socket connection having a polygonal cross section to prevent relative rotation between the tongue and the socket.

5. Anti-roll mechanism as claimed in claim 1, wherein said cross bar includes portions extending in opposite directions from said torsion bar, each of said end pieces being slidably mounted on a corresponding one of said arms.

6. Anti-roll mechanism as claimed in claim 5, wherein said driver controlled linkage includes an actuation mechanism maintaining each of said end pieces at substantially the same distance from said torsion bar.

7. Anti-roll mechanism as claimed in claim 6, wherein each of said end pieces is mounted on its corresponding portion of said cross bar via a bearing permitting pivoting of said end pieces relative to said cross bar and an inner race mounting each said end piece for sliding movement along its corresponding portion of said cross arm.

8. Anti-roll mechanism as claimed in claim 6, wherein said actuation mechanism includes a first lever arm pivotally connected to one of said end pieces, a second lever arm pivotally connected to the other end piece, and an intermediate lever pivotally connected to both of said first and second levers.

9. Anti-roll mechanism as claimed in claim 8, wherein said intermediate lever is mounted for pivoting about the axis of said torsion bar.

10. Anti-roll mechanism as claimed in claim 9, wherein said linkage includes a cable connected to one of said levers, said cable being controllable by the vehicle driver to operate said levers to move said end pieces along their corresponding portions of the cross bar.

11. Anti-roll mechanism as claimed in claim 6, wherein said vehicle defines a pitch axis extending in a horizontally normal to said roll axis, said mounting member being pivotally connected to said vehicle to permit pivoting of the vehicle relative to the mounting member about said pitch axis.

12. Anti-roll mechanism as claimed in claim 6, wherein said torsion bar and said mounting member are connected by a first tongue and said torsion bar and said cross bar are connected by a second tongue and socket connection, each of said tongue and socket connections having a polygonal cross section to prevent relative rotation between the tongue and the socket.

13. Anti-roll mechanism as claimed in claim 12, wherein said torsion bar has opposite ends, said first tongue and socket connection connecting said mounting member to one end of the torsion bar and said cross bar to the other end of said torsion bar.

14. Anti-roll mechanism for a vehicle having a suspension system mounting wheels on opposite sides of the vehicle for movement relative to said vehicle, said anti-roll mechanism being connected to the suspension system for controlling vehicle movement about the roll axis of the vehicle, said anti-roll mechanism comprising a torsion bar, a cross bar mounted on said torsion bar and extending transversely with respect thereto, suspension end pieces slidably mounted on said cross bar for movement toward and away from the torsion bar, said suspension including means for connecting each of said wheels to a corresponding one of said end pieces, and driver controlled means for moving said end pieces along said cross bar toward and away from the torsion bar.

15. Anti-roll mechanism as claimed in claim 14, wherein said driver controlled means includes a pair of levers pivotally connected to each of said end pieces and means for synchronizing pivoting of the levers to maintain the end pieces equidistant from said torsion bar.

16. Anti-roll mechanism as claimed in claim 14, wherein said driver controlled means includes means for controlling movement of the end pieces to maintain the end pieces equidistant from said torsion bar.

17. Anti-roll mechanism as claimed in claim 16, wherein each of said end pieces are connected to said cross bar via bearing means permitting pivoting and sliding of the end pieces relative to the cross bar.

18. Anti-roll mechanism as claimed in claim 14, wherein wherein said driver controlled means includes a pair of levers pivotally connected to each of said end pieces and an intermediate lever pivotally connected to both of said first and second levers for intermediate pivoting of the levers to maintain the end pieces equidistant from said torsion bar.

19. Anti-roll mechanism as claimed in claim 18, wherein said intermediate lever is mounted for pivoting about the axis of the torsion bar.

20. Anti-roll mechanism as claimed in claim 18, wherein said intermediate lever is mounted via a pivoting connection to one end of the torsion bar.

* * * * *